United States Patent
Stupakiewicz et al.

(10) Patent No.: US 10,037,777 B1
(45) Date of Patent: Jul. 31, 2018

(54) ULTRAFAST PHOTOMAGNETIC RECORDING IN A DIELECTRIC MEDIUM USING ANISOTROPIC IONS EFFECTIVE GILBER DAMPING

(71) Applicant: UNIWERSYTET W BIALYMSTOKU, Bialystok (PL)

(72) Inventors: Andrzej Stupakiewicz, Bialystok (PL); Krzysztof Szerenos, Księżyno (PL)

(73) Assignee: UNIWERSYTET W BIALYMSTOKU, Bialystok (PL)

( * ) Notice: Subject to any disclaimer, the term of this patent is extended or adjusted under 35 U.S.C. 154(b) by 0 days.

(21) Appl. No.: 15/641,352

(22) Filed: Jul. 5, 2017

(51) Int. Cl.

| | |
|---|---|
| G11B 11/00 | (2006.01) |
| G11B 11/14 | (2006.01) |
| G11B 5/65 | (2006.01) |
| G11B 11/105 | (2006.01) |
| G11B 5/00 | (2006.01) |
| G11B 5/60 | (2006.01) |
| G11B 7/24 | (2013.01) |

(52) U.S. Cl.
CPC ............. *G11B 11/14* (2013.01); *G11B 5/656* (2013.01); *G11B 5/6088* (2013.01); *G11B 7/24* (2013.01); *G11B 11/10586* (2013.01); *G11B 2005/0021* (2013.01)

(58) Field of Classification Search
None
See application file for complete search history.

(56) References Cited

U.S. PATENT DOCUMENTS

| | | | | |
|---|---|---|---|---|
| 4,314,894 A | * | 2/1982 | Schmelzer | G11C 11/14 204/192.2 |
| 6,700,720 B1 | * | 3/2004 | Allenspach | G11B 5/00 360/123.01 |
| 9,159,350 B1 | * | 10/2015 | Wang | G11B 5/66 |
| 2004/0131893 A1 | * | 7/2004 | Sato | G11B 5/7325 428/832 |
| 2009/0244960 A1 | * | 10/2009 | Saito | G11C 11/15 365/158 |
| 2014/0355401 A1 | * | 12/2014 | Huang | G11B 5/4866 369/13.29 |
| 2017/0206921 A1 | * | 7/2017 | Nagaosa | G11B 5/74 |

OTHER PUBLICATIONS

Electrical Properties of Yttrium Iron garnet, R. Metselaar, Depart. of Physical Chemistry, Eindhoven University of Technology Eindhoven, The Netherlands, Jan. 1978.*

Ferromagnetic Resonance Linewidth in Ultrathin Films With perpendicular magnetic Anisotropy, Beaujour et al, Dept. of Physics, new York University, Jun. 2009.*

Optical and Magneto-Optical behavior of cerium Yttrium Iron garnet thin film at wavelengths of 200-1770nm, Mehmet et al, Scientific Report, Mar. 30, 2016.*

Layer-Specific measurement of Ultrafast Spin Dynamics in GdFeCo Double Layers With Dielectric Interlayer, Sato et al, Journal of the magnetic Society of Japan, vol. 38, No. 3-2, 2014.*

* cited by examiner

Primary Examiner — Tan X Dinh
(74) Attorney, Agent, or Firm — Mark M. Friedman

(57) ABSTRACT

A recording medium comprising a dielectric magnetic layer, the dielectric magnetic layer comprising anisotropic ions having a difference in a single ion contribution to magnetic anisotropy ($\Delta K$/ion) between a ground state and an excited state of said anisotropic ions equal to at least 0.1 cm$^{-1}$ (0.0124 meV/ion) at 20° C. (68° F.), wherein the effective Gilbert damping ($\alpha$) of said dielectric magnetic layer is equal to at least 0.01.

17 Claims, 7 Drawing Sheets

ULTRAFAST PHOTOMAGNETIC RECORDING IN A DIELECTRIC MEDIUM USING ANISOTROPIC IONS EFFECTIVE GILBER DAMPING

STATEMENT REGARDING PRIOR DISCLOSURES BY THE INVENTOR OR A JOINT INVENTOR

The following disclosure(s) are submitted under 35 U.S.C. 102(b)(1)(A):
- A. Stupakiewicz et al. "Ultrafast nonthermal photo-magnetic recording in a transparent medium" (Nature 542, 71-74, 2 Feb 2017, doi:10.1038/nature20807);
- A. Stupakiewicz et al. "Ultrafast nonthermal photo-magnetic recording in a transparent medium" (arXiv preprint, 7 Aug. 2016, arXiv:1609.05223v1).

TECHNICAL FIELD

The present disclosure relates to the field of photomagnetic recording.

DESCRIPTION OF THE RELATED ART

Thus far, magnetic recording was based mainly on metallic materials, as in the case of recording media used in the modern hard drives.

There is a need to provide new ways to control the magnetic state of media with low production of heat and at fast speeds. In metals, it is possible to switch the magnetization between two stable states (and thus to record magnetic bits) using femtosecond circularly polarized laser pulses. However, the switching mechanisms in these materials are directly related to laser-induced heating close to the Curie temperature.

A U.S. Pat. No. 8,164,988 discloses a perpendicular magnetic recording system that uses bit-patterned media (BPM) and circularly polarized light to switch the magnetization of the discrete magnetic bits by the inverse Faraday effect. The recording layer is metallic and the recording medium is patterned into separate islands. The recording in such metallic systems, using laser pulses, is based on a thermal mechanism and requires strong laser-induced heating up to Curie temperature ($\Delta T \sim 200$-500 K).

A U.S. Pat. No. 9,280,996 discloses an "all optical switching" (AOS) magnetic recording system, i.e. one that does not require a magnetic field to reverse the magnetization in the magnetic recording media, that uses a FeMnPt as the magnetic media. Therefore, the recording layer is metallic. It has been observed that a FeMnPt alloy, with appropriate amounts of Mn, will have high magneto-crystalline anisotropy, but also ferrimagnetic spin alignment for triggering the AOS. The combination of high magneto-crystalline anisotropy and ferrimagnetic spin configuration enables the FeMnPt media to function as magnetic media whose magnetization can be switched solely by polarized laser pulses. The FeMnPt media may be also patterned to form bit-patterned-media (BPM).

A U.S. patent application US20140368303 discloses a method of magnetization suitable for reversal in a multi component magnetic system, the system comprising at least a first magnetic sub system and a second magnetic sub system, the first and second sub systems being coupled anti-ferromagnetically, wherein the method comprises applying a stimulus to the magnetic system thereby reversing at least one magnetic moment of the first sub system, wherein the stimulus is an ultrafast heat pulse of duration less than 100 ps. A multi-sublattice magnet is used, which is typically a ferrimagnet, with two or three magnetic sublattices, coupled antiferromagnetically.

Although several possible routes for achieving all-optical switching in magnetic dielectrics have been discussed (see: Atoneche, F. et al. "Large ultrafast photoinduced magnetic anisotropy in a cobalt-substituted yttrium iron garnet" (Phys. Rev. B 81, 214440 (2010)), Hansteen, F. et al. "Femtosecond photomagnetic switching of spins in ferrimagnetic garnet films" (Phys. Rev. Lett. 95, 047402 (2005)), no such recording has hitherto been demonstrated for magnetic dielectrics. In particular, there was no disclosure of using only a single laser pulse, without external magnetic field required.

SUMMARY

There is disclosed herein a recording medium comprising a dielectric magnetic layer, the dielectric magnetic layer comprising anisotropic ions having a difference in a single ion contribution to magnetic anisotropy ($\Delta K$/ion) between a ground state and an excited state of said anisotropic ions equal to at least 0.1 cm$^{-1}$ (0.0124 meV/ion) at 20° C. (68° F.), wherein the effective Gilbert damping ($\alpha$) of said dielectric magnetic layer is equal to at least 0.01.

The dielectric magnetic layer may have an amorphous structure comprising 3d, 4d, 5d or 4f transition metal ions as the anisotropic ions.

The dielectric magnetic recording layer may have a crystalline structure selected from a group comprising: ferrite (garnet, spinet, ortho- and hexaferrite, ferric borates, magnetite), perovskite, corundum, wurzite, zincblende, Heusler, cubic, hexagonal, tetragonal; wherein the dielectric magnetic recording layer is comprising 3d, 4d, 5d or 4f transition metal ions as the anisotropic ions.

The anisotropic ions can be ions with non-zero spin and orbital degeneracy in their ground level, selected from a group comprising 3d ions $Mn^{2+}$, $Mn^{3+}$, $Cr^{2+}$, $Cr^{3+}$, $Fe^{2+}$, $Co^{2+}$, $Co^{3+}$, $Ni^{2+}$, $Ni^{3+}$, 4d ions $Ru^{3+}$, $Ru^{4+}$ and 5d ions $Ir^{3+}$, $Ir^{4+}$, 4f ions $Ce^{3+}$, $Tb^{3+}$.

The recording medium may further comprise additional elements selected from a group comprising: Ga, Ge, In, Sn, Sb, Ti, Bi.

The recording medium can be provided on a substrate which is selected from a group comprising: GGG, MgO, Si, GaAs, SiC, GaN, SiO2, Al2O3 or glass.

The recording medium may comprise a plurality of dielectric magnetic layers made of different materials.

The recording medium may comprise a plurality of dielectric magnetic layers separated by non-magnetic or metallic spacer layers.

The dielectric magnetic layer may have a thickness of not more than 10 μm.

Such recording medium can be effectively used for ultrafast photomagnetic recording method and system as described below.

There is also disclosed herein a method for photomagnetic recording comprising: providing a recording medium comprising a dielectric magnetic layer, the dielectric magnetic layer comprising anisotropic ions having a difference in a single ion contribution to magnetic anisotropy ($\Delta K$/ion) between a ground state and an excited state of said anisotropic ions equal to at least 0.1 cm$^{-1}$ (0.0124 meV/ion) at 20° C. (68° F.), wherein the effective Gilbert damping ($\alpha$) of said dielectric magnetic layer is equal to at least 0.01; illuminating said dielectric magnetic layer by a light pulses that have a pulse duration equal to not more than 100 ps; tuning a wavelength and a polarization of the light pulses to cause optical resonances excitation of said anisotropic ions, thereby inducing transitions to the excited states of said anisotropic ions of said dielectric magnetic layer.

Such method results in inducing a change of magnetic anisotropy in the dielectric magnetic layer by the laser pulses excitation of the anisotropic ions via the nonthermal ultrafast photomagnetic effect. Consequently, the change of magnetic anisotropy results in an all-optical magnetization switching in the excited regions of the recording medium, thereby enabling magnetization switching without the need for an external magnetic field pulses from a write head. Due to the nonthermal mechanism, the heat load on the recording layer at the threshold laser fluence for switching can be less than 600 J/cm$^3$.

There is also disclosed herein a system for photomagnetic recording comprising: a recording medium comprising a dielectric magnetic layer, the dielectric magnetic layer comprising anisotropic ions having a difference in a single ion contribution to magnetic anisotropy ($\Delta K$/ion) between a ground state and an excited state of said anisotropic ions equal to at least 0.1 cm$^{-1}$ (0.0124 meV/ion) at 20° C. (68° F.), wherein the effective Gilbert damping ($\alpha$) of said dielectric magnetic layer is equal to at least 0.01; a light source for emitting light pulses that have a pulse duration equal to not more than 100 ps; a polarizer for polarizing light output from said light source; a light guide for directing the polarized light to the recording medium to cause optical resonances excitation of said anisotropic ions, thereby inducing transitions to the excited states of said anisotropic ions of said dielectric magnetic layer.

The system can be embedded in a hard disk drive (HDD).

The system can be embedded in a random-access memory (RAM).

The system can further comprise a near-field transducer for coupling the light from the light guide to the recording medium.

The light source can be a diode laser, Vertical-Cavity Surface-Emitting-Laser (VCSEL), a quantum well, a quantum dot based laser or a sub-wavelength plasmonic nanoparticle laser.

The light source may comprise two light sources connected in series, configured to emit different light wavelengths, wherein the wavelength of the first light source is tuned to the anisotropic ions resonances in the dielectric magnetic layer, whereas wavelength of the second light source is different from the wavelength of the first light source and detuned from the ions resonances.

The system can further comprise a magnetic tunnel junction magnetically coupled to the dielectric recording layer and means for reading a resistance of the magnetic tunnel junction to effect bit state reading.

The disclosed method and a system allow nonthermal all-optical magnetic recording in a dielectric medium, using laser light rather than an external magnetic field or heating as a stimulus for the magnetization switching. By changing a linear polarization of laser pulses, one can steer a net magnetization in the dielectric medium, thus writing "0" and "1" magnetic bits at will. Both bit write and erase operations are performed with laser pulses only. The ultrafast photomagnetic recording method disclosed herein is based on a novel nonthermal physical mechanism, which is unexpected and has never been suggested in a scientific literature or prior patent art. The nonthermal mechanism allows unprecedentedly low heat load. The heat dissipation is negligible. The large effective damping in the recording medium plays an important role in the switching process, stopping the motion of magnetization in the closest energy minima and preventing back-switching, which would be a possible risk in a low-damping system.

The present disclosure demonstrates all-optical recording of the magnetization, based on the ultrafast photomagnetic effect, using only single laser pulses in an exemplary dielectric material YIG doped with strongly anisotropic Co ions. Moreover, this effect can be engineered by doping in numerous materials, not only the YIG:Co dielectric garnet system presented as an example. Based on this, a class of materials is identified, which exhibit a similar recording mechanism, based on a selected necessary material parameters further discussed in the following parts of the disclosure. In this regard, the ultrafast photomagnetic effect in dielectrics allows to solve two problems in data storage systems: recording speed and low energy consumption.

BRIEF DESCRIPTION OF DRAWINGS

The present disclosure is accompanied by drawings, in which.

NOTATION AND NOMENCLATURE

Figure 1:
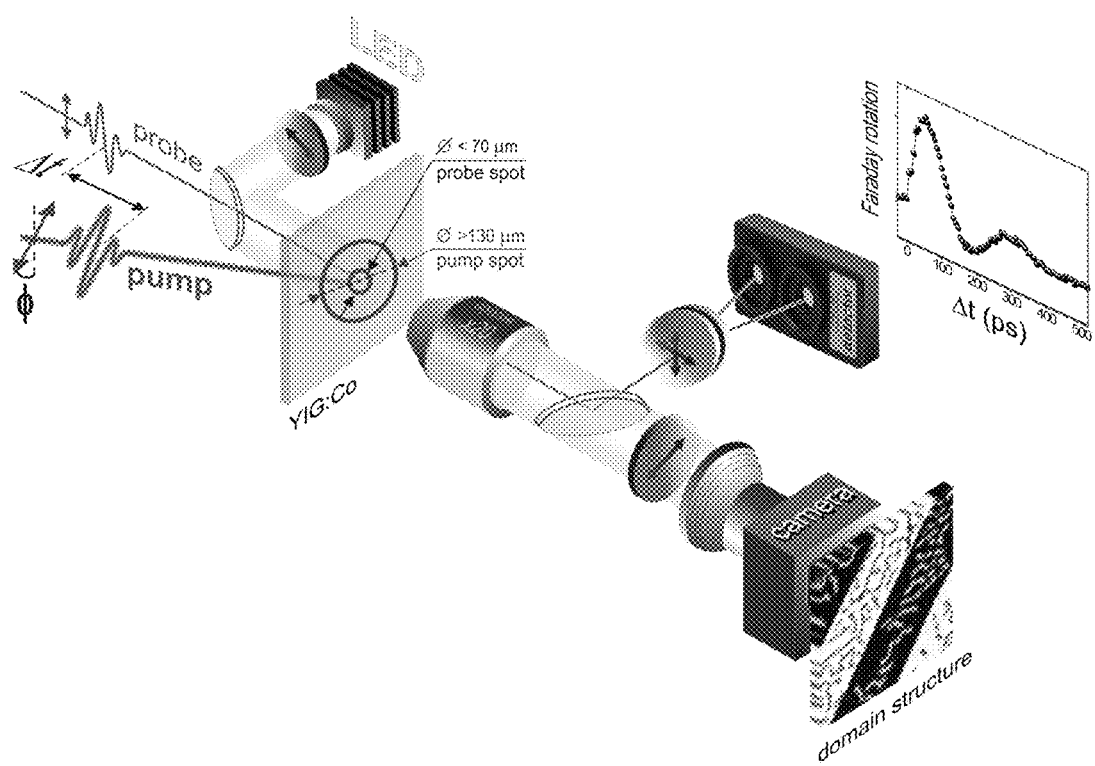
FIG. 1 shows a design of a time-resolved pump—probe experimental set-up for investigations of the all-optical magnetic recording.

Terms such as "processing" or "creating" or "transferring" or "executing" or "determining" or "detecting" or "obtaining" or "selecting" or "calculating" or "generating" or the like, refer to the action and processes of a computer system that manipulates and transforms data represented as physical (electronic) quantities within the computer's registers and memories into other data similarly represented as physical quantities within the memories or registers or other such information storage.

As used herein, the term "example" means serving as a non-limiting example, instance, or illustration. As utilized herein, the terms "for example" and "e.g." introduce a list of one or more non-limiting examples, instances, or illustrations.

As used herein, the term "ultrafast" means femtosecond and picosecond time scale.

As used herein, the term "ultrashort laser pulse" means pulses with durations of femtoseconds or picoseconds

DETAILED DESCRIPTION

This disclosure relates to a method for performing ultrafast magnetic recording in an all-optical manner, using only single laser pulses and employing a dielectric recording medium, under no external magnetic field required for the magnetization switching. The method is based on a novel physical mechanism and it offers vast speed and energy-efficiency improvements over state-of-the-art.

This disclosure also relates generally to a magnetic recording system based on the presented method. The system can be employed in a Hard Disk Drive (HDD) or a magnetic Random Access Memory (RAM). As such, the presented method and system significantly simplify magnetic recording as they remove the need for a use of magnetic coils, which are typically used for a bit writing operation in modern HDDs and suffer from limited operation speed.

The photomagnetic effect, as typically reported in the scientific literature, is not an ultrafast phenomenon, but rather relates to slow, light-induced domain wall motion or the changes of magnetic permeability under continuous-wave (CW) laser illumination on the timescale of seconds. It will be shown in this disclosure how the magnitude of the effect can be enhanced, thus allowing ultrafast photo-magnetic recording, by using ultrashort laser pulses for the excitation, instead of a CW laser. Since such ultrashort laser pulses have orders of magnitude larger peak power and the pulse energy is concentrated only in a very brief moment of time, this makes the excitation both ultrastrong and ultrafast. Then one can achieve a significantly larger concentration of excited ions in comparison to CW-laser excitation (before the ions relaxation can have its effect) and thus also achieve much larger amplitude of the light-induced anisotropy field. The change of magnetic anisotropy is then sufficient to trigger ultrafast magnetization switching.

The ultrafast photomagnetic effect, which is employed for the recording here, is a general effect which can be engineered in various dielectric materials. Thus, the all-optical recording as described herein can be also performed for other dielectric materials besides YIG:Co presented as an example only.

The general requirements for the materials engineering of photomagnetic recording medium useful for the presented method and system are:
- dielectric (for the nonthermal dynamics),
- large Gilbert damping $\alpha > 0.01$ (to stop the excited magnetization motion at the final state after switching),
- the material is hosting strongly anisotropic, light sensitive ions;
- wherein the ions possess an optical resonance which can be excited by tuning the laser pulse wavelength and polarization, thus inducing transition from the ground to the excited state of the ions; wherein the ground and excited states have different contribution to the single ion magnetic anisotropy ($\Delta K/ion > 0.1$ cm$^{-1}$ or 0.0124 meV/ion at 20° C. (68° F.), i.e. at a room temperature).

By tuning the laser light wavelength, polarization and intensity one can excite optical transitions of these ions, change their electronic configuration and consequently also their contribution, to the magnetic anisotropy, thus manipulating the energetically-preferred magnetization direction.

In general, the dielectric magnetic medium can be amorphous in structure, as well as crystalline (single or polycrystalline). Examples of suitable materials are ferrites (garnet, spinel, ortho- and hexaferrites, ferric borates, magnetite), perovskites, Heusler compounds, spin glasses or transition metal oxides. The anisotropic ions with strong contribution to single ion anisotropy are typically 3d, 4d, 5d or 4f transition metal ions, especially ions with non-zero spin and orbital degeneracy in their ground level. Examples of appropriate ions are 3d ions $Mn^{2+}$, $Mn^{3+}$, $Cr^{2+}$, $Cr^{3+}$, $Fe^{2+}$, $Co^{2+}$, $Co^{3+}$, $Ni^{2+}$, $Ni^{3+}$, 4d ions $Ru^{3+}$, $Ru^{4+}$ and 5d ions $Ir^{3+}$, $Ir^{4+}$, 4f ions $Ce^{3+}$, $Tb^{3+}$.

A particular instance of a suitable material is silicone-doped garnet YIG:Si (due to the $Fe^{2+}$ ions), cobalt-doped garnet YIG:Co ($Co^{2+}$ and $Co^{3+}$ ions) or cobalt spinel $CoFe_2O_4$ ($Co^{2+}$ ions). The dielectric recording medium properties can also be modified by the use of other ions—for instance, the YIG:Co system magnetic and optical properties can by fine-tuned by doping with $Ge^{4+}$, $Ti^{4+}$ and $Bi^{3+}$ ions. The disclosed method can also be used in antiferromagnetic materials (two magnetic sublattices with equal and opposite magnetic moments, yielding zero net magnetization).

As an example, the all-optical recording will be demonstrated in a cobalt-substituted yttrium iron garnet (YIG:Co), which is an optically transparent dielectric with a cubic lattice and ferrimagnetic ordering due to two antiferromagnetically coupled spin sublattices of $Fe^{3+}$ in both tetrahedral and octahedral sites. The Co ions substitute Fe ions and are responsible for a strong magnetocrystalline and photo-induced magnetic anisotropy as well as for a very large Gilbert damping $\alpha = 0.2$.

FIG. 1 shows a design of a time-resolved pump—probe experimental set-up for investigations of all-optical magnetic recording. The domain structure of the garnet films can be visualized using a magneto-optical polarizing microscope with a standard light-emitting diode (LED) source of polarized light as a probe. In this case, the central wavelength of pump pulses with duration of 50 fs can be varied within the spectral range 1,150-1,450 nm. Relying on the fact that domains with different orientation of the magnetization will result in different angles of the Faraday rotation, the domains are visualized with the help of an analyser and a charge-coupled device (CCD) camera. The images were acquired about 10 ms after excitation with a single pump pulse.

The magnetization switching results were obtained on YIG:Co film d=7.5 μm thick with composition $Y_2CaFe_{3.9}Co_{0.1}GeO_{12}$. The single-crystal YIG:Co garnet film was grown by liquid-phase epitaxy on GGG—gadolinium gallium garnet $Gd_3Ga_5O_{12}$ (001)-oriented substrates of 400 μm thickness. The saturation magnetization at room temperature was $4\pi$ MS=90 G and the Néel temperature was 445 K.

In an unperturbed state at room temperature, the equilibrium orientation of the magnetization is defined by cubic ($K_1 = 8.4 \times 10^3$ erg cm$^{-3}$) and uniaxial ($K_U = -2.5 \times 10^3$ erg cm$^{-3}$) anisotropy, which favor orientation of the magnetization along one of the body diagonals of the cubic cell (<111>-type of axes) and perpendicular to the [001] axis, respectively. For easier distinction between different magnetic domains, a garnet film is used with a miscut of 4° towards the [001] axis. The large stripe-like domains have magnetizations along $M^{(L)}+$ near the [1-11] and $M^{(L)}-$ near the [11-1] axes and the small labyrinth-like domains have magnetizations along $M^{(S)}+$ near the [111] and $M^{(S)}-$ the [1-1-1] axes [1].

Figure 2:
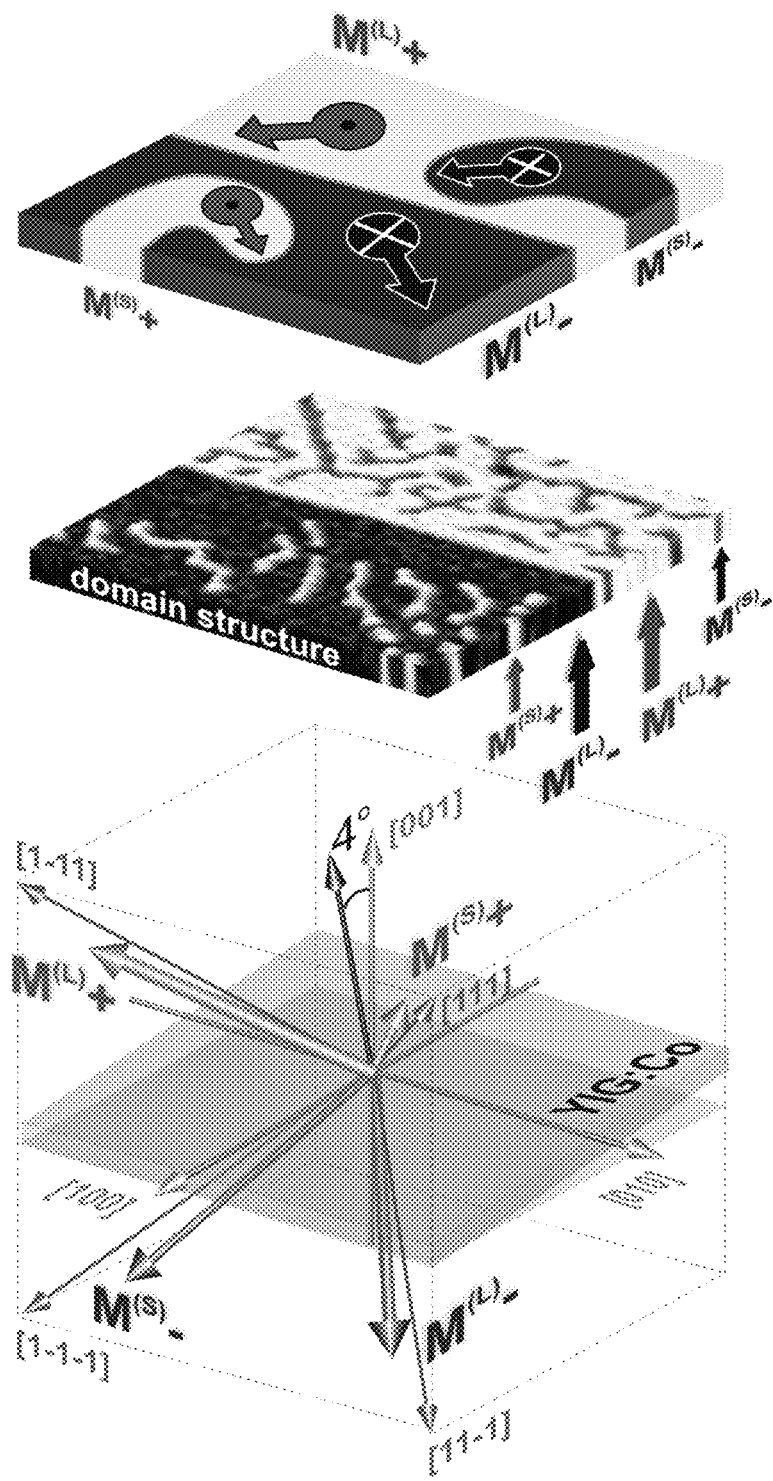
FIG. 2 shows magnetic states and domain structure of YIG:Co.

FIG. 2 shows magnetic states and domain structure of YIG:Co. Orientations of the easy magnetization axes and the pattern of magnetic domains with the magnetization directions close to the [111], [1-11], [11-1] and [1-1-1] axes, measured at zero magnetic field with a magneto-optical polarizing microscope. The recording with linearly polarized light in YIG:Co can be achieved by the technique of femtosecond magneto-optical imaging using pump pulse with duration of 50 fs, as disclosed in the publication A. Stupakiewiez et al. "Ultrafast nonthermal photo-magnetic recording in a transparent medium" (Nature 542, 71 (2017), which is incorporated by reference herein.

Figure 3A:
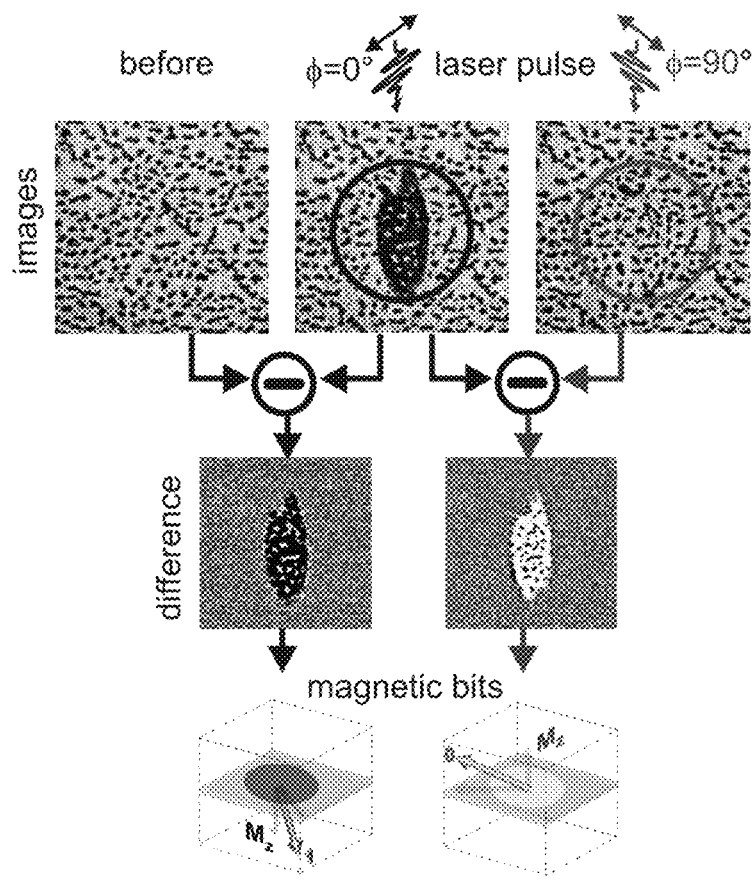
FIG. 3A shows a single-pulse photo-magnetic switching.

FIG. 3A shows images of magnetic domains taken before and after the excitation with a single pump laser pulse. The images are 200×200 μm² large. The pump beam with the wavelength of 1300 nm was focused to a spot of 130 μm in diameter and with maximum fluence of 150 mJ/cm². The domain pattern before the laser excitation, after excitation with a single laser pulse polarized along the [100] axis, and subsequent excitation with a similar laser pulse polarized along the [010] axis. Bottom panel schematically demonstrates the switching of the magnetization between two magnetic states $M^{(L)}+$ and $M^{(L)}-$ corresponding to all-optical recording of magnetic bits "0" and "1".

Figure 3B:
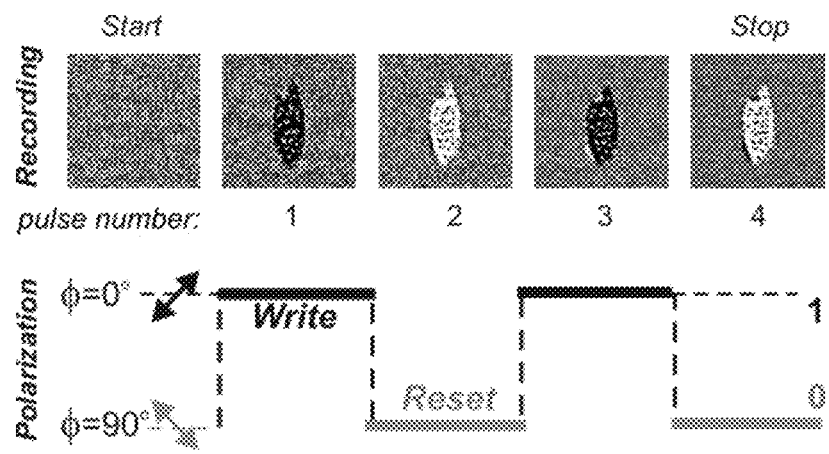
FIG. 3B shows differential changes after each of single laser pulse excitations and a schematic demonstration of an ultrafast photo-magnetic recording of "0" and "1" bits with linearly polarized pulses.

Taking the difference between the images underlines the photo-magnetic changes and is used for detailed analysis. Light can lift the degeneracy between the domains by generating photo-induced magnetic anisotropy. In this case, pumping the initial pattern of magnetic domains with a single laser pulse polarized along the [100] axis ($\phi=0°$) turns large white domains ($M^{(L)}+$) into large black ones ($M^{(L)}-$). Simultaneously, small black domains ($M^{(S)}+$) turn into small white ones ($M^{(S)}-$). The domain pattern stays remarkably unperturbed, only the contrast reverses. The initial state can be restored by pumping with a single laser pulse polarized along the [010] axis ($\phi=90°$). The recorded domains are stable due to the non-zero coercivity of the garnet film at room temperature, as shown in FIG. 3B.

Figure 4:
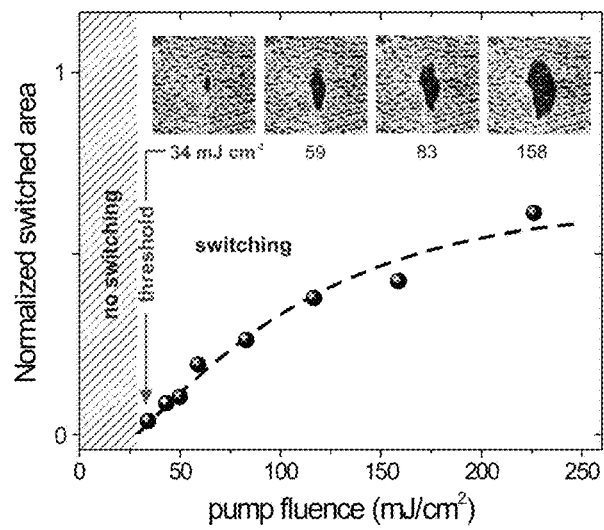
FIG. 4 shows an energy efficiency of the all-optical magnetic recording, along with a threshold laser pulse fluence for switching.

The minimum pump fluence required for the magnetic recording in YIG:Co is very sensitive to the wavelength of the pump pulse. The switched area estimated from the magneto-optical images is plotted as a function of the pump fluence for different pump wavelengths, as shown in FIG. 4. It is seen that the minimum pump fluence required to form a domain in sample with d=7.5 μm thick is about $I_{min}=34$ mJ/cm². As the film is d=7.5 μm thick, the amount of absorbed photons required for the switching of the magnetization corresponds to depositing $\alpha I_{min}/d \approx 6$ J/cm³ of heat. For instance, recording a bit with the size 20×20×10 nm³ would be accompanied by dissipations of as low as 22 aJ. To the best of the inventors' knowledge this is much lower than in the case of all-optical switching of metals 10 fJ (Reference [3]) as well as in existing cases of hard disk drives 10-100 nJ (Reference [4]), flash memory 10 nJ or spin-transfer torque random—access memory 450 pJ-100 fJ (Reference [5]). It is also notable that polarization and wavelength sensitivity is a characteristic feature of nonthermal spin dynamics, whereas thermal dynamics depend only pump fluence and heating of spins, For this experiment, the heating due to the pump pulse is less than 1.25 K (Reference [1]).

The wavelength was varied in the range between 1150 nm and 1450 nm (1.08-0.86 eV), where the light resonantly excites electronic d-d transitions in Co-ions (Reference [2]).

In the YIG:Co film, a resonant pumping of the transitions in $Co^{3+}$ and $Co^{2+}$ ions at the tetrahedral sites at 1305 nm is accompanied by absorption of about 12% ($\alpha=0.12$) of light energy. The spectral dependence in FIG. 5 reveals a pronounced resonant behavior around this wavelength.

Figure 5:
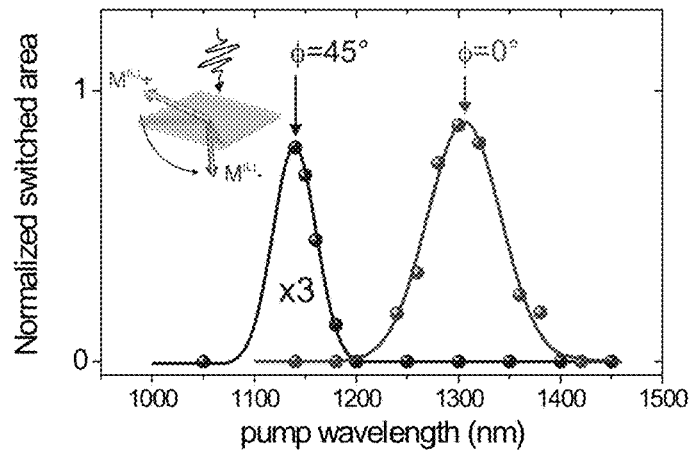
FIG. 5 shows spectrally-selective ultrafast photomagnetic recording in YIG:Co by tuning a laser pulse wavelength and polarization to anisotropic Co ions optical resonances.

The inventors have observed that the ultrafast photomagnetic recording is spectrally tunable by selective pumping of different Co sublattices. Changing the pump wavelength within near infrared range and linear polarization of femtosecond laser pulses along [110] or [100] directions resonantly pumps the optical transitions in Co ions, as shown in FIG. 5. FIG. 5 indicates the switched domain size dependence on the laser wavelength λ after excitation with five pump pulses for the two Co optical transitions with λ=1140 nm and 1300 nm absorption peaks. The domain size follows the Gaussian peak shape. Such a strong spectral and polarization-sensitive manipulation by means of photomagnetic recording method is a unique feature of dielectric medium. The precise tuning of the laser pulse parameters to the ions resonance maximizes the efficiency the photomagnetic effect and enables ultrafast creation of light-induced anisotropy field $H_L$ (within the laser pulse duration), with $H_L$ magnitude comparable to the intrinsic anisotropy, allowing ultrafast magnetization switching.

To quantify the dynamics of the laser-induced changes, the inventors have studied the time-delay between the pump and probe pulses. It is seen that the recorded domain emerges with the characteristic time τ of about 20 ps and gets stabilized after about 60 ps (Reference [1]). In reality in YIG:Co film, the life-time of the photo-induced anisotropy at room temperature is also of the order of 60 ps (Reference [6]) and the damping is indeed very large, yielding $\alpha=0.2$ from FMR measurements. From the orientation of the linear polarization of the pump light which results in the recording it can be concluded that the photo-induced anisotropy originates from optical excitation of Co ions at tetrahedral sites (Reference [6]). Note that the amplitude of the spin precession induced by light is also at maximum when the linear polarization of light is along the [100] or the [010] axes thus supporting the above described mechanism.

Figure 6:
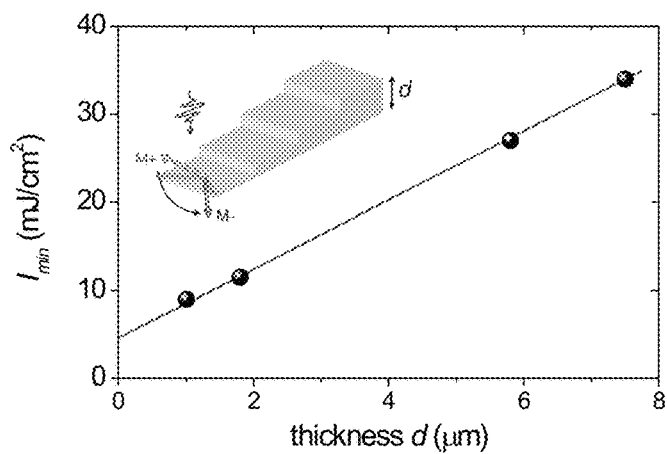
FIG. 6 shows the threshold fluence $I_{min}$ required for magnetization switching decreases with a garnet thickness d.

Additionally, the inventors found find that the threshold laser fluence required for the photomagnetic recording decreases with the thickness of garnet films, minimizing the heat load, as shown in FIG. 6. In FIG. 6, the linear pump polarization was along [100] with λ=1300 nm. The extrapolation to nm-sized bits yields extremely small energy requirements for the magnetic recording of 3.1 aJ/bit, indicating that such photomagnetic recording approach might be exceptionally energy-efficient.

As to why the cold photomagnetic recording is so extremely efficient, a simple answer follows from the argument that this method directly reduces the energy bather for switching. Other recording methods are based on either overcoming the energy barrier (as with applied field and spin-transfer torque) or trying to modify the barrier indirectly, as in the case of strong heating in HAMR, which is used to temporarily lower the coercivity, or the thermally-induced all-optical switching in the metallic systems. The photomagnetic recording approach is unique in the respect that the strongly anisotropic dopant Co ions, which are responsible for the magnetic anisotropy of YIG:Co, are resonantly excited by the laser pulses. Then the bulk of the light energy absorbed for the switching goes directly into the dopant Co ions for the modification of the energy barrier and thus extremely little energy is wasted—the dielectric matrix itself absorbs below few % of the incoming energy. The inventors have determined that the possibility of such resonant excitation is a unique feature of magnetic dielectrics, where any thermal effects are vastly limited in comparison to all-optical switching in metals.

The recording medium can be provided on a substrate flamed by various materials, such as GGG, MgO, Si, GaAs, SIC, GaN, $SiO_2$, $Al_2O_3$ or glass.

EXAMPLE EMBODIMENTS

Figure 7:
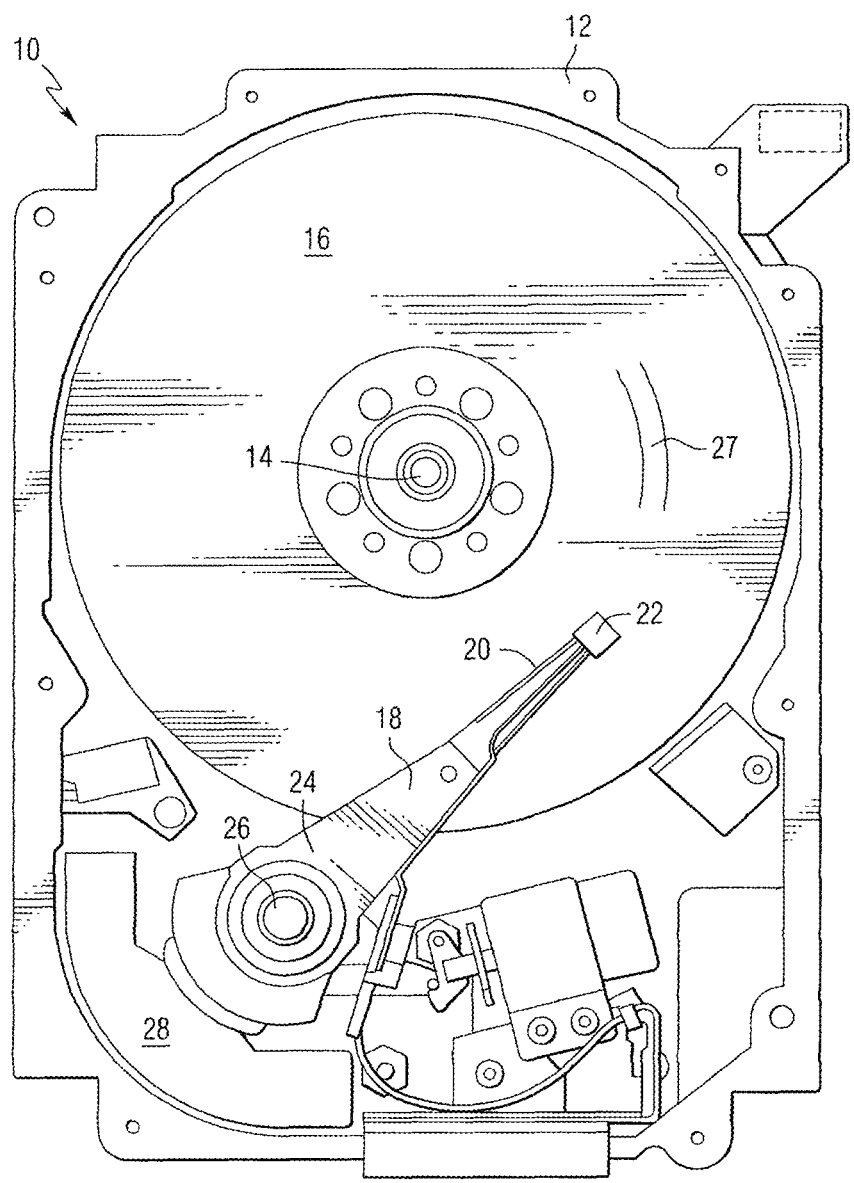
FIG. 7 shows a top view of a typical hard disk drive storage device.

FIG. 7 (prior art) represents a general structure of a hard disk drive (HDD) 10, which is a starting point for one of the possible embodiments of the recording system based on the disclosed method. Accordingly, the recording medium should be a dielectric magnetic suitable for the nonthermal ultrafast photomagnetic recording requirements specified in the disclosure. A typical HDD contains a plurality of data tracks 27 deposited on a disk platter 16 which is rotated by the means of a spindle motor 14. The disk write/read head is placed on the slider 22 connected to the actuator arm 18, wherein the arm position is controlled by the means of a voice coil motor 28, which rotates the arm 18 about the bearing 26, allowing to pivot the disk arm 18 and position the recording head 22 over a selected track 27 of the disk 16. The general principles of mechanical construction of such HDD storage devices are well known in the art.

In a typical HDD, the magnetic bits are recorded by applying the magnetic field pulses generated by the electrical current pulses running through the recording coil (writer) within the disk head. However, such approach is limited in terms of speed and maximum achievable magnetic field amplitude. For the high-density recording media used in the Heat Assisted Magnetic Recording (HAMR) HDDs, the disk head cannot produce sufficiently high magnetic field to switch the bits, making the thermal assist necessary to temporarily decrease the medium coercivity. The thermal assist is due to the sub-wavelength focusing of laser light on the selected bits within the recording medium by the means of a near-field transducer. However, this approach is still limited to the switching by magnetic field pulses, and thus limited in terms of speed.

It will be shown in the following description how one can remove the coils from the HDD head and employ only laser light pulses for the all-optical recording in a magnetic dielectric material, provided the material fulfills the specified requirements. Additionally, the system enables minimum heat load on the dielectric recording medium under all-optical writing operations, as opposed to the thermally-driven all-optical switching in metallic systems, which require strong heating close to the Curie temperature for the laser-induced reversal.

Figure 8A:
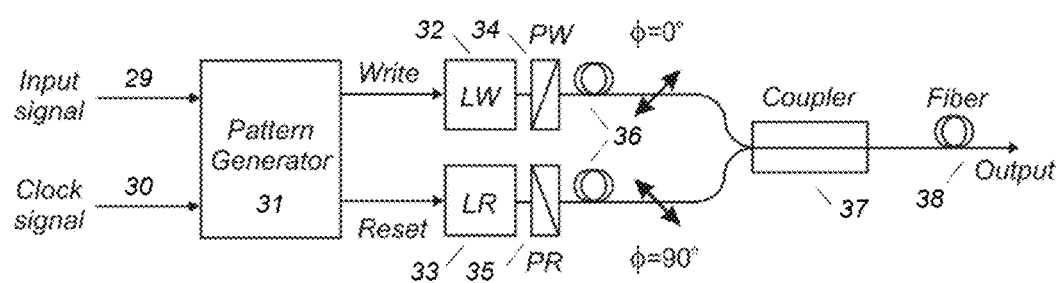
FIG. 8A shows a schematic diagram of an optical system for the ultrafast photomagnetic recording.

FIG. 8A shows a schematic diagram of an optical system for the ultrafast photomagnetic recording. The recording is controlled by a clock signal 30. An input signal 29 containing the host data to be recorded is sent to a pattern generator 31. The pattern generator 31 is an electrical pulse generator, which controls an input current of lasers: a laser write (LW) 32 and a laser reset (LR) 33 in synchronization with the clock signal 30. The lasers (LW 32, RW 33) can be selectively triggered by supplying the input current from the pattern generator 31. The optical output from the lasers 32, 33 is sent through linear optical polarizers: a write polarizer (PW) 34 and a reset polarizer (PR) 35 of the respective lasers 32, 33. Thus, the laser pulses of two orthogonal linear polarizations can be emitted into fiber waveguides 36 and combined using a fiber coupler 37 into a single fiber output 38. The output laser pulses are then routed to the recording media. The laser can be a simple solid state source, such as a diode laser, Vertical-Cavity Surface-Emitting-Laser (VCSEL), a quantum well or a quantum dot based laser.

Figure 8B:
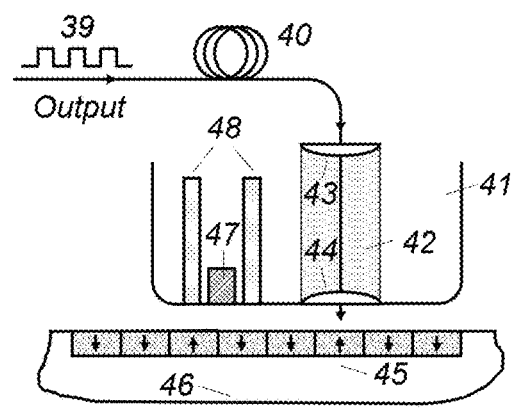
FIG. 8B shows a schematic diagram of a nonthermal ultrafast photomagnetic recording system embodiment based on a hard disk drive.

FIG. 8B is a schematic diagram of a photomagnetic recording system embodiment based on a HDD, according to the disclosed method, wherein a plurality of magnetic dielectric bits 45 are located on a disk platter 46 (equivalent to the disk platter of the typical HDD of FIG. 7) having a generally planar surface. In the HDD-like embodiment, the recording medium can be a rotatable disk supported by a spindle motor that rotates about an axis perpendicular to the platter 46 surface. The magnetic bits 45 can be arranged in concentric circular data tracks. The disk head carrier 41 has an air-bearing surface that faces the disk 46 and enables hovering the carrier 41 over the disk 46 surface in a close proximty, down to few nanometers distance. Using an optical fibre 40, the linearly polarized laser light pulses 39 output from the optical system are delivered to a waveguide 42 within the carrier 41. The light pulses from the fiber 40 are focused and coupled into the waveguide using lens 43 and then focused on the recording layer using lens 44. The carrier 41 also supports a read head 47 screened by magnetic field shields 48. The HDD servos precisely position the actuator arm and the carrier over selected data tracks, allowing the head to access individual bits for the photomagnetic recording.

Another embodiment of the recording system presented herein may further comprise a near-field transducer instead of the lens 44 for the focusing of the laser light below the optical diffraction limit, in order to switch nanometer-sized bits.

In general, the recording medium may not only be a rotating disk as in HDD, but also an array of discrete memory cells as in a random access memory (RAM) or solid state drives (SSD). As the routing of laser pulses over chips presents logic-level restoration issues, a simpler approach is to employ a miniaturized light source integrated with the memory cell.

Figure 9A:
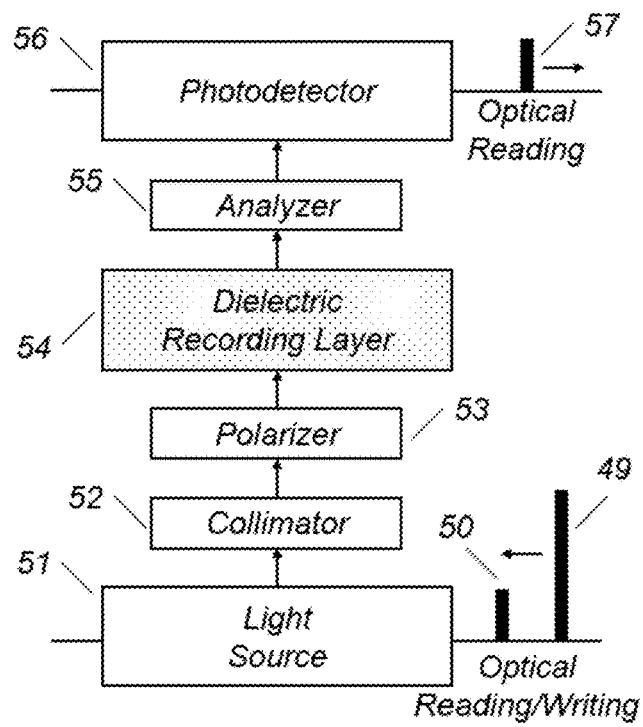
FIG. 9A shows a schematic diagram of a photomagnetic random access memory cell embodiment using magneto-optical read.

FIG. 9A shows a schematic of a RAM-like memory cell embodiment of the disclosed system, enabling both optical write and optical read operations. The cell comprises a laser light source 51, a dielectric recording layer 54 and a photodetector 56 for the reading of the bit state. The information within each cell is nonvolatile and stored in the magnetic dielectric recording layer 54.

The light source 51 can be a simple miniaturized solid state source, such as a diode laser, Vertical-Cavity Surface-Emitting-Laser (VCSEL), a quantum well or a quantum dot based laser. A suitable light source can also be a sub-wavelength plasmonic nanoparticle laser with coupling of the near field plasmmonic mode to the far field optical mode, yielding photon emission into the recording layer 54. Depending on the particular type and dimensions of the laser source, the laser emission might not be direcional, thus requiring an external collimator 52 to efficiently couple the laser emission to the recording layer 54. This is especially relevant for the sub-wavelength laser sources.

The memory cell comprises terminals for electrical communication with the memory controller. The write/read operation is achieved using a write pulse 49 and a read pulse 50. The write pulse has a larger magnitude than the read pulse and. thus represents the injection of larger current into the laser gain medium, producing a higher light emission intensity. The intensity of laser 51 emission under the write pulse 49 injection is sufficient to trigger the switching of the dielectric recording layer 54. However, the intensity of laser 54 emission under the read pulse 50 is lower and only sufficient to aquire a read signal 57 on the photodetector 56 for the magnetooptical reading operation, without triggering switching of the recording layer.

In FIG. 9A the reading employs magnetooptical effects, such as a Faraday effect. The polarizer 53 and the analyzer 55 can be metallic gratings or nanowires arranged so as to pass predefined linear light polarization and diminish orthogonal light polarization. The Faraday rotation angle $\theta_F$ can be measured with a single photodetector, provided the material thickness and magnitude of polarization rotation result in $\theta_F$=45° and the polarizer-analyzer angle is also 45°. Then light is either fully transmitted or fully blocked, corresponding to a high/low signal on the photodetector 56, which can be a simple miniaturized quantum well-based photodetector.

Additionally, a variation of the system embodiment presented in FIG. 9A may further comprise two light sources connected in series, such as two quantum wells configured to emit different light wavelengths, wherein the wavelength of the first light source is tuned to the anisotropic ions resonances in the dielectric magnetic layer and facilitates switching, whereas the second light source emits a different wavelength, detuned from the ions resonance, only suitable for the magnto-optical read operation.

Figure 9B:
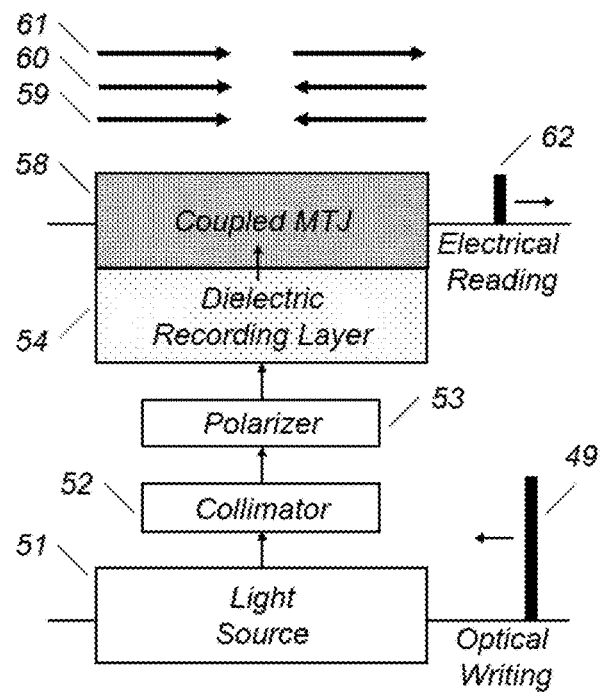
FIG. 9B shows a schematic diagram of a photomagnetic random access memory cell embodiment using electrical resistive read.

FIG. 9B shows another embodiment of the disclosed recording system. Herein, the optical write operation is still carried using the current injection into the laser light source 51, but the reading operation is carried electrically as an electrical resistance measurement 62 over a Magnetic Tunnel Junction (MTJ) 58 coupled to the dielectric recording layer 54. As shown on the arrow schematics (top of FIG. 9B), depending on the arrangement of the magnetization in the dielectric recording layer 59, the magnetization of the MTJ free layer 60 coupled to the dielectric and the magnetization of the MTJ fixed layer 61, the MTJ will register high or low resistance level representing the binary state of the dielectric 54.

While the invention presented herein has been depicted, described, and has been defined with reference to particular preferred embodiments, such references and examples of implementation in the foregoing specification do not imply any limitation on the invention. It will, however, be evident that various modifications and changes may be made thereto without departing from the broader scope of the technical concept. The presented preferred embodiments are exemplary only, and are not exhaustive of the scope of the technical concept presented herein. Accordingly, the scope of protection is not limited to the preferred embodiments described in the specification, but is only limited by the claims that follow.

REFERENCES

[1] A. Stupakiewicz, K. Szerenos, D. Afanasiev, A. Kirilyuk, A. V. Kimel, "Ultrafast nonthermal photo-magnetic recording in a transparent medium", *Nature* 542, 71 (2017).

[2] Z. Šimša, Optical and magnetooptical properties of Co-doped YIG films. *Czech. J Phys. B* 34, 78-87 (1984).

[3] M. Savoini, R. Medapalli, B. Koene, A. R. Khorsand, L. Le Guyader, L. Duò, M. Finazzi, A. Tsukamoto, A. Itoh, F. bolting, A. Kirilyuk, A. V. Kimel, Th. Rasing, Highly efficient all-optical switching of magnetization in GdFeCo microstructures by interference-enhanced absorption of light. *Phys. Rev. B* 86, 140404(R) (2012).

[4] A. Hylick, R. Sohan, A. Rice, B. Jones, An Analysis of Hard Drive Energy Consumption, Proceedings of MASCOTS. *IEEE Comp. Soc.* 103-112 (2008).

[5] K. L. Wang, J. G. Alzate, Amiri, P. Khalili, Low-power non-volatile spintronic memory: STT-RAM and beyond. *J. Phys. D: Appl. Phys.* 46, 074003 (2013).

[6] F. Atoneche, A. M. Kalashnikova, A. V. Kimel, A. Stupakiewicz, A. Maziewski, A. Kirilyuk, Th. Rasing, Large ultrafast photoinduced magnetic anisotropy in a cobalt-substituted yttrium iron garnet. *Phys. Rev. B* 81, 214440 (2010).

The invention claimed is:

1. A recording medium comprising at least one dielectric magnetic recording layer, the dielectric magnetic recording layer comprising anisotropic ions having a difference in a single ion contribution to magnetic anisotropy ($\Delta$K/ion) between a ground state and an excited state of said anisotropic ions equal to at least 0.1 cm$^{-1}$ (0.0124 meV/ion) at 20° C. (68° F.), wherein the effective Gilbert damping ($\alpha$) of said dielectric magnetic recording layer is equal to at least 0.01.

2. The recording medium of claim 1, wherein the dielectric magnetic recording layer has an amorphous structure comprising 3d, 4d, 5d or 4f transition metal ions as the anisotropic ions.

3. The recording medium of claim 1, wherein the dielectric magnetic recording layer has a crystalline structure selected from a group comprising: ferrite (garnet, spinel, ortho- and hexaferrite, ferric borates, magnetite), perovskite, corundum, wurzite, zincblende, Heusler, cubic, hexagonal, tetragonal; wherein the dielectric magnetic recording layer is comprising 3d, 4d, 5d or 4f transition metal ions as the anisotropic ions.

4. The recording medium of claim 1, wherein the anisotropic ions are ions with non-zero spin and orbital degeneracy in their ground level, selected from a group comprising 3d ions $Mn^{2+}$, $Mn^{3+}$, $Cr^{2+}$, $Cr^{3+}$, $Fe^{2+}$, $Co^{2+}$, $Co^{3+}$, $Ni^{2+}$, $Ni^{3+}$, 4d ions $Ru^{3+}$, $Ru^{4+}$ and 5d ions $Ir^{3+}$, $Ir^{4+}$, 4f ions $Ce^{3+}$, $Tb^{3+}$.

5. The recording medium of claim 1, wherein the dielectric magnetic recording layer further comprises additional elements selected from a group comprising: Ga, Ge, In, Sn, Sb, Ti, Bi.

6. The recording medium of claim 1, wherein the dielectric magnetic recording layer is provided on a substrate which is selected from a group comprising: GGG, MgO, Si, GaAs, SiC, GaN, SiO2, Al2O3 or glass.

7. The recording medium of claim 1, comprising a plurality of dielectric magnetic recording layers made of different materials.

8. The recording medium of claim 1, comprising a plurality of dielectric magnetic recording layers separated by non-magnetic or metallic spacer layers.

9. The recording medium of claim 1, wherein the dielectric magnetic recording layer has a thickness of not more than 10 μm.

10. A method for ultrafast photomagnetic recording comprising:

providing a recording medium comprising at least one dielectric magnetic recording layer, the dielectric magnetic recording layer comprising anisotropic ions having a difference in a single ion contribution to magnetic anisotropy ($\Delta$K/ion) between a ground state and an excited state of said anisotropic ions equal to at least 0.1 cm$^{-1}$ (0.0124 meV/ion) at 20° C. (68° F.), wherein the effective Gilbert damping ($\alpha$) of said dielectric magnetic recording layer is equal to at least 0.01;

illuminating said dielectric magnetic recording layer by a light pulses that have a pulse duration equal to not more than 100 ps;

tuning a wavelength and a polarization of the light pulses to cause optical resonances excitation of said anisotropic ions, thereby inducing transitions to the excited states of said anisotropic ions of said dielectric magnetic recording layer.

11. A system for ultrafast photomagnetic recording comprising:

a recording medium comprising a dielectric magnetic recording layer, the dielectric magnetic recording layer comprising anisotropic ions having a difference in a single ion contribution to magnetic anisotropy ($\Delta K$/ion) between a ground state and an excited state of said anisotropic ions equal to at least 0.1 cm$^{-1}$ (0.0124 meV/ion) at 20° C. (68° F.), wherein the effective Gilbert damping ($\alpha$) of said dielectric magnetic recording layer is equal to at least 0.01;

a light source for emitting light pulses that have a pulse duration equal to not more than 100 ps;

a polarizer for polarizing light output from said light source;

a light guide for directing the polarized light to the recording medium to cause optical resonances excitation of said anisotropic ions, thereby inducing transitions to the excited states of said anisotropic ions of said dielectric magnetic recording layer.

12. The system of claim 11 embedded in a hard disk drive (HDD).

13. The system of claim 11 embedded in a random-access memory (RAM) chip.

14. The system of claim 11, further comprising a near-field transducer for coupling the light from the light guide to the recording medium.

15. The system of claim 11, wherein the light source is a diode laser, Vertical-Cavity Surface-Emitting-Laser (VCSEL), a quantum well, a quantum dot based laser or a sub-wavelength plasmonic nanoparticle laser.

16. The system of claim 11, wherein the light source comprises two light sources connected in series, configured to emit different light wavelengths, wherein the wavelength of the first light source is tuned to the anisotropic ions resonances in the dielectric magnetic recording layer, whereas wavelength of the second light source is different from the wavelength of the first light source and detuned from the ions resonances.

17. The system of claim 11, further comprising a magnetic tunnel junction magnetically coupled to the dielectric recording layer and means for reading a resistance of the magnetic tunnel junction to effect bit state reading.

* * * * *

UNITED STATES PATENT AND TRADEMARK OFFICE
CERTIFICATE OF CORRECTION

PATENT NO. : 10,037,777 B1
APPLICATION NO. : 15/641352
DATED : July 31, 2018
INVENTOR(S) : Stupakiewicz et al.

Page 1 of 1

It is certified that error appears in the above-identified patent and that said Letters Patent is hereby corrected as shown below:

On the Title Page

TITLE OF INVENTION (54):
Change "ULTRAFAST PHOTOMAGNETIC RECORDING IN A DIELECTRIC MEDIUM USING ANISOTROPIC IONS EFFECTIVE GILBERT DAMPING"
To -- ULTRAFAST PHOTOMAGNETIC RECORDING IN A DIELECTRIC MEDIUM USING ANISOTROPIC IONS AND EFFECTIVE GILBERT DAMPING --

Signed and Sealed this
Twenty-fifth Day of September, 2018

Andrei Iancu
*Director of the United States Patent and Trademark Office*